United States Patent [19]

Mueller

[11] 4,350,322
[45] Sep. 21, 1982

[54] HIGH TORQUE PLUG VALVE ACTUATOR

[75] Inventor: John H. Mueller, Cincinnati, Ohio

[73] Assignee: Grove Truseal Valve Company, Cincinnati, Ohio

[21] Appl. No.: 297,752

[22] Filed: Aug. 31, 1981

[51] Int. Cl.³ .................. F16K 31/50; F16K 31/52
[52] U.S. Cl. .................................. 251/229; 74/25;
  74/57; 137/556; 251/163; 251/252; 251/249.5;
  251/267
[58] Field of Search ............... 74/22 R, 25, 89, 89.14,
  74/424.8 R, 57, 424.8 VA; 251/56, 58, 14, 229,
  251, 252, 266, 267, 257, 258, 249.5, 269, 163;
  137/556

[56] References Cited

U.S. PATENT DOCUMENTS

| | | | |
|---|---|---|---|
| 2,412,529 | 12/1946 | Mueller | 251/163 |
| 2,964,961 | 12/1960 | Gulick | 251/267 |
| 3,046,802 | 7/1962 | Cupedo | 251/62 |
| 3,370,827 | 2/1968 | Stehlin | 251/14 |
| 3,396,938 | 8/1968 | Matsui | 251/229 |
| 3,417,960 | 12/1968 | Stehlin | 251/58 |
| 3,492,880 | 2/1970 | Pearson | 251/58 |
| 3,606,801 | 9/1971 | Williams | 74/424.8 R |
| 3,793,893 | 2/1974 | Heiner | 251/229 |
| 4,120,479 | 10/1978 | Thompson et al. | 251/229 |

Primary Examiner—George L. Walton
Attorney, Agent, or Firm—Frost & Jacobs

[57] ABSTRACT

A high torque actuator for a plug valve of the type having a body with a central chamber having diametrically opposed inlet and outlet ports and a plug within the chamber having a transverse passage therethrough and an upstanding stem. The plug has a first, upper, valve-open position with its transverse passage in alignment with the inlet and outlet ports of the chamber, and a second, lower valve-closed position wherein its transverse passage is oriented at 90° to the chamber inlet and outlet ports and seal means on the plug are in sealing engagement with the chamber walls about the inlet and outlet ports. Drive cam means are introduced between a coupling and the valve stem in order to increase torque output of inclined cam slots without changing or increasing the height of the valve body and plug.

9 Claims, 11 Drawing Figures

HIGH TORQUE PLUG VALVE ACTUATOR

REFERENCE TO RELATED APPLICATION

The present invention constitutes an improvement upon the plug value actuator taught in the copending application Ser. No. 29,678, filed Apr. 13, 1979, now U.S. Pat. No. 4,293,117, in the name of John H. Mueller and entitled "PLUG VALUE ACTUATOR".

TECHNICAL FIELD

The invention relates to a plug valve actuator of the type which shifts the plug between a closed and sealed position and an open position in which the plug is rotated 90° with respect to its closed position, the actuator being such that the plug is not rotated while its seals are in contact with the valve body chamber walls, and more particularly to such an actuator capable of high torque output.

BACKGROUND ART

The present invention is directed to an improved actuator for plug-type values. While the particular use made of the valve does not constitute a limitation of the present invention, it is particulary well suited for use with large valves or high pressure valves.

Prior art workers have utilized a number of arrangements of cam slots and cam follower means for translating linear motion into rotative motion, or vice versa, in association with the actuation of valves. U.S. Pat. Nos. 2,596,075 and 3,492,880 are exemplary of those prior art actuators for valves of the plug type wherein, when the plug is to be shifted from its valve-closed position to its valve-open position, it is first lifted vertically and thereafter rotated. When the valve plug is to be shifted from its valve-open position to its valve-closed position, it is first rotated and thereafter lowered to its valve-closed position. In the structure of both of these patents, the vertical linear motion and the rotative motion are wholly separate, occurring one after another.

The above mentioned copending application teaches an improved plug valve actuator wherein, when the actuator shifts the plug from its valve-closed position to its valve-open position, it first lifts the plug vertically without rotation and thereafter simultaneously lifts and rotates the valve to its final valve-open position. During the valve-closing procedure, the actuator first simultaneously rotates and lowers the plug, and thereafter continues to lower the plug without rotation into its final valve-closed and sealed position. As a result, the resilient seals of the plug are never rotated when in contact with the valve body, thus assuring prevention of abrasion of the resilient seals. Furthermore, rotation of the plug 90° between its valve-open and valve-closed positions is accomplished in a minimum of vertical travel of the plug and since this rotation is accomplished simultaneously with a portion of the vertical shifting of the plug during both the opening and closing operations, the valve body and plug can be compact.

The teachings of the above-noted copending application are incorporated herein by reference. Briefly, the copending application teaches the provision of an actuator for a plug valve of the type having a body with a central chamber and diametrically opposed inlet and outlet ports communicating with the central chamber. The valve has a plug within the chamber, the plug having a transverse passage therethrough and an upstanding stem.

The plug has a first, upper valve-open position within the chamber with the transverse plug passage being in alignment with the inlet and outlet ports. The plug has a second, lower, valve-closed position within the chamber wherein its transverse passage is oriented at 90° to the inlet and outlet ports and wherein seal means on the plug are in sealing engagement with the chamber wall about the inlet and outlet ports. The top of the chamber is closed by a bonnet having a packing gland through which the plug stem extends upwardly.

The actuator comprises a hollow, cylindrical yoke, the lower end of which is affixed to the bonnet with the plug stem extending partway into the yoke. A bearing cap is mounted at the upper end of the yoke. A drive nut, having a threaded axial bore and a hand wheel or other manual manipulator affixed thereto, is rotatively mounted in the bearing cap. A threaded stem is engaged in the drive nut. The lower end of the threaded stem and the upper end of the plug stem are both non-rotatively affixed to a cylindrical coupling within the yoke.

In one embodiment of the invention, the cylindrical coupling has a pair of diametrically opposed, identical, L-shaped cam slots. Each of the L-shaped cam slots has a first vertical portion and a second portion which extends 90° about the coupling and slopes downwardly throughout its length. The yoke has two cam pins threadedly engaged in diametrically opposed perforations in the yoke, the innermost ends of the cam pins being unthreaded and engaged in the cam slots of the coupling. In a second embodiment of the invention of the copending application, a pair of identical, diametrically opposed cam slots are formed in the body of the yoke itself. These cam slots are similar to those just described but are of the inverted L-shaped configuration. Thus, the cam slots formed in the yoke each have a first portion which extends 90° about the yoke and slopes downwardly from their beginning points to the juncture with their second portions which extend vertically downwardly. In this second embodiment, the coupling within the yoke carries a pair of cam followers, each engaged in one of the yoke cam slots.

In both embodiments of the invention, the configuration of the cam slots is such that upon turning the drive nut in one direction, the plug (in its valve-open position) will be simultaneously partially lowered and turned 90°. Thereafter, continued turning of the drive nut will lower the plug without rotation to its valve-closed and sealed position. When the drive nut is turned in the opposite direction, the plug (in its valve-closed position) will first be lifted vertically without rotation out of sealing relationship with chamber inlet and outlet ports. Continued rotation of the value nut in this direction will cause the plug to be simultaneously lifted and rotated 90° to its full valve-open position.

In basic valve design of this kind, it is desirable to keep the height of the body and the plug to a minimum, for rigidity and to minimize the cost of material and machining. Since the vertical travel during rotation of the plug 90° between its valve-open and valve-closed positions is a function of the angle of the cam slots in the cylindrical coupling, the selection of the cam slot angle is a trade-off between low angle, short body and minimum torque output on the one hand and high angle, long body and high torque output on the other. The present invention teaches a drive cam means introduced between the coupling and the valve stem in order to increase torque output of the inclined cam slots without changing or increasing the height of the valve body and plug. The valve actuator of the present invention still comprises a minimum of parts, all of which are readily servicable and replaceable. The actuator is extremely simple and compact in construction and inexpensive to manufacture. It remains self-locking against torque imparted to the plug by the fluid medium passing through the valve.

DISCLOSURE OF THE INVENTION

In accordance with the invention there is provided an actuator for a plug valve of the type having a body with a central chamber and diametrically opposed inlet and outlet ports communicating therewith. The plug is located within the valve chamber and has a transverse passage therethrough and an upstanding stem. The plug is shiftable between a first, upper, valve-open position within the chamber, with the transverse plug passage being in alignment with the inlet and outlet ports, and a second, lower, valve-closed position within the chamber wherein its transverse passage is oriented at 90° to the inlet and outlet ports of the valve and wherein seal means on the plug are in sealing engagement with the chamber wall about the inlet and outlet ports. The top of the chamber is closed by a bonnet having a packing gland through which the plug stem extends upwardly.

The actuator comprises a hollow, cylindrical yoke. The lower end of the yoke is affixed to the valve body bonnet with the plug stem extending partway into the yoke. The upper end of the yoke is surmounted by a bearing spool, containing thrust bearings. A valve stem is rotatively mounted in the bearing spool with its upper end extending thereabove and its lower end extending into and axially of the yoke. The upper end valve stem is operatively connected to a handwheel or other manual manipulator. The lower end of the valve stem, extending into the yoke, is threaded.

A cylindrical coupling with an axial bore is provided. The upper end of the plug stem is inserted n the lower end of the cylindrical coupling and affixed thereto in a non-rotative fashion. The cylindrical coupling has a pair of diametrically opposed, identical, L-shaped cam slots. Each of the L-shaped cam slots has a first vertical portion and a second portion which extends 90° about the coupling and the slopes downwardly throughout its length. The yoke is provided with a pair of diametrically opposed cam pins, threadedly engaged therein. The innermost ends of the cam pins are unthreaded, extend radially inwardly of the yoke, and are engaged in the cam slots of the coupling.

A cylindrical drive cam is provided, having an axial bore, the upper portion of which is internally threaded and threadedly engaged by the lower end of the valve stem. The drive cam is provided with a pair of diametrically opposed, vertical slots. The yoke has two guide pins threadedly engaged in diametrically opposed perforations in the yoke. The innermost ends of the guide pins are unthreaded and engaged in the vertical slots in the drive cam, thus precluding rotation of the drive cam within the yoke.

The lower end of the drive cam is provided with a diametrically opposed pair of identical angled slots. That portion of the drive cam having the angled slots is received within the upper portion of the axial bore of the coupling. The coupling is pinned to the drive cam by means of a drive pin extending through diametrically opposed holes in the coupling and through the diametrically opposed angled slots of the drive cam.

It will be evident that rotation of the handwheel or other manual manipulator, resulting in rotation of the valve stem, will, in turn, result in axial shifting of the drive cam. Since the drive cam is operatively connected to the coupling, and since the coupling is non-rotatively affixed to the plug stem, axial shifting within the yoke of the drive cam will result in axial shifting of the valve plug. In addition to the axial motion the drive cam will impart additional torque during the quarter turn.

The configuration of the coupling cam slots is such that, upon turning the valve stem in one direction, the plug (in its valve-open position) will be simultaneously lowered and rotated 90°. Thereafter, continued turning of the valve stem will lower the plug without rotation to its valve-closed and sealed position. Throughout the quarter turn of the plug during the valve-closing process, the thrust of the drive cam is directed through the connecting pin to the coupling, and a substantial part of this force is converted to torque because of the angle selected for the drive cam slots.

When the valve stem is turned in the opposite direction, the plug (in its valve-closed position) will first be lifted vertically without rotation out of sealing relationship with the chamber inlet and outlet ports. Continued rotation of the valve stem in this direction will cause the plug to be simultaneously lifted and rotated 90° to its full valve-open position. Again, during the rotational movement of the plug, part of the force imparted by the drive cam is converted to torque to increase the torque output of the inclined and circumferential portions of the L-shaped cam slots of the coupling.

DETAILED DESCRIPTION OF THE INVENTION

Figure 1:
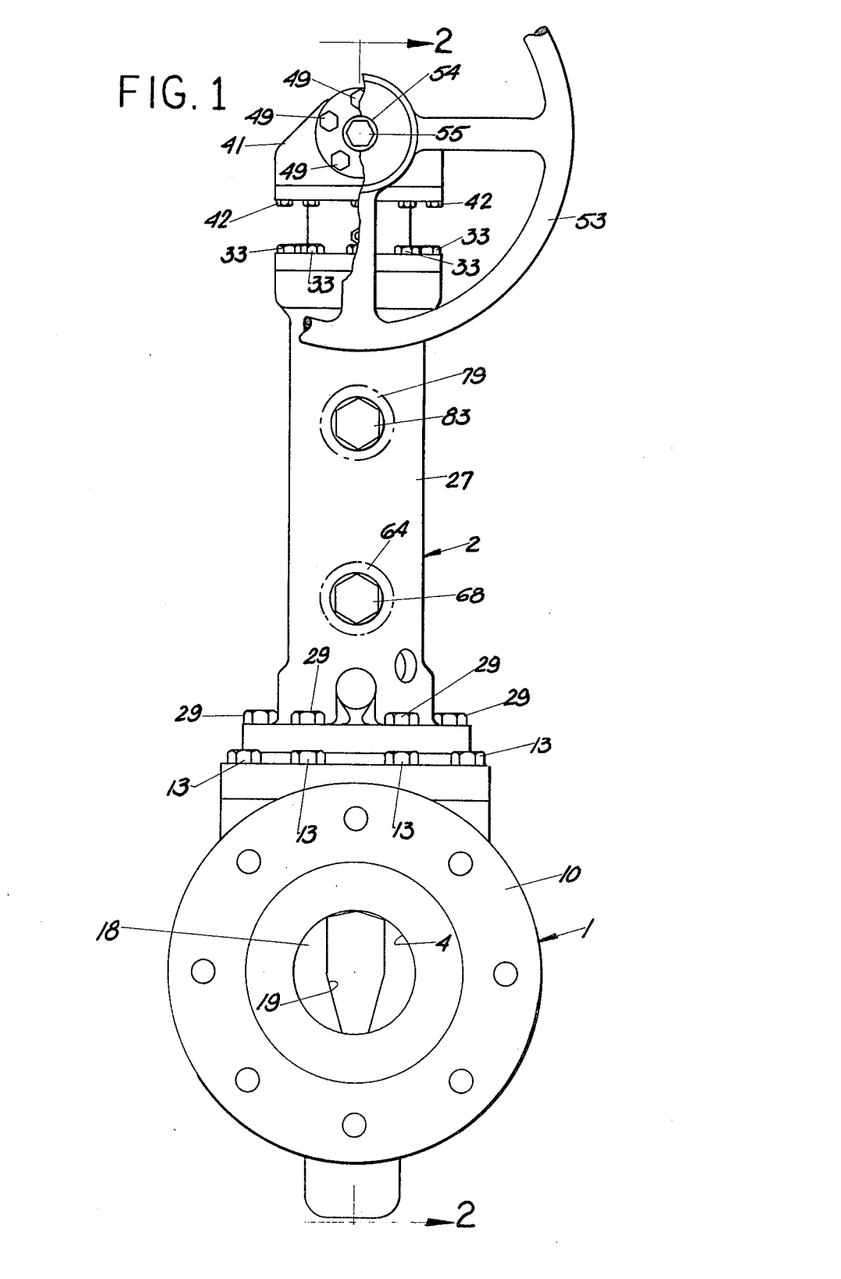
FIG. 1 is an elevational view of a valve incorporating the valve actuator of the present invention, the valve plug being shown in its valve-open position.
Figure 2:
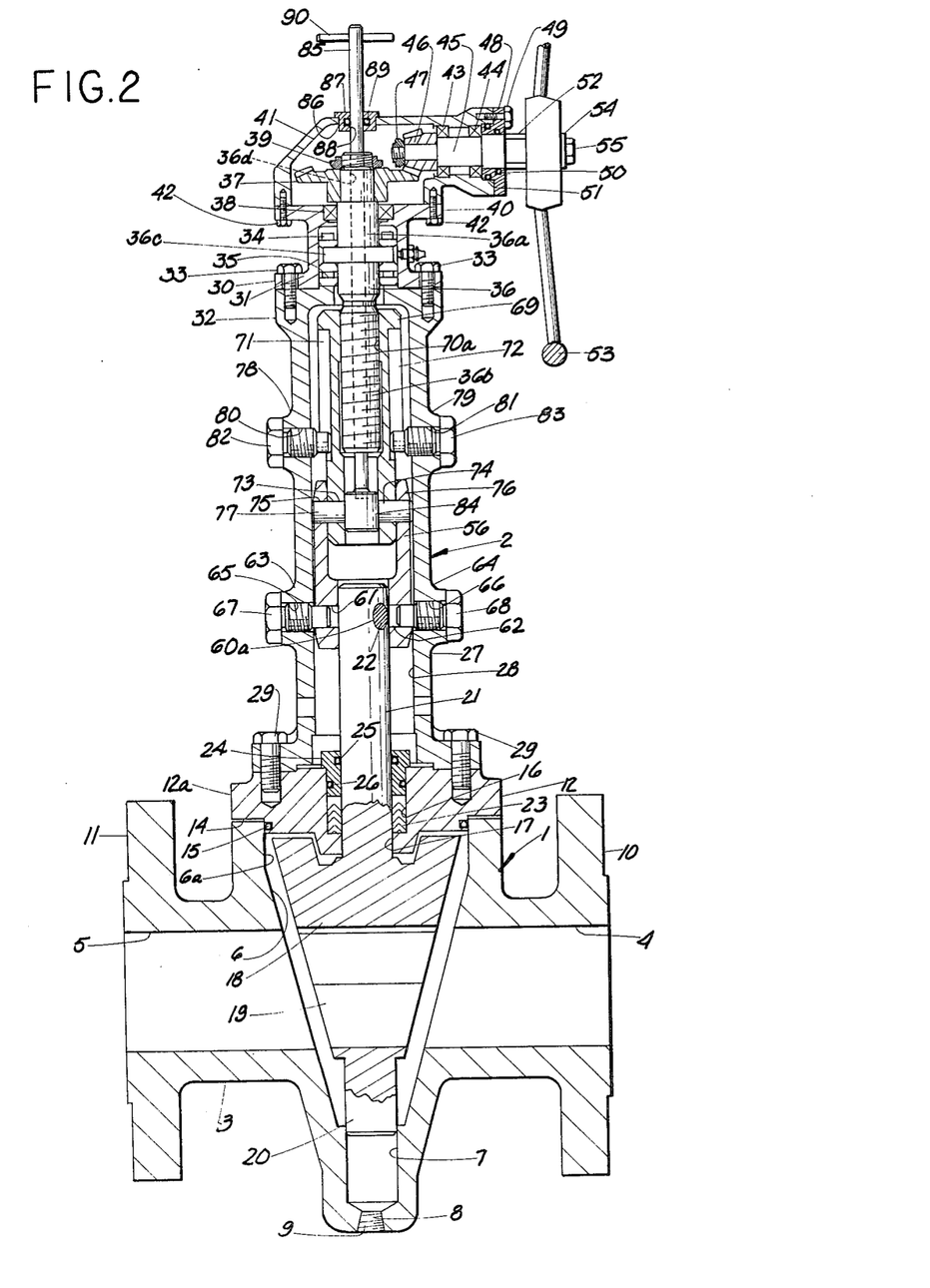
FIG. 2 is a cross-sectional view taken along Section Line 2—2 of FIG. 1.

Throughout the figures like parts have been given like index numerals. Reference is first made to FIGS. 1 and 2 which illustrate a valve provided with the valve actuator of the present invention. The valve is generally indicated at 1 and the valve actuator is generally indicated at 2. The valve comprises a body 3 having an inlet port 4 and an outlet port 5. Between inlet port 4 and outlet port 5 there is a substantially conical valve chamber 6. The upper end of the valve chamber 6 is cylindrical, as at 6a, and is open. At the lower end of the valve chamber 6 there is a cylindrical bore 7 formed in the valve body and terminating in a port 8 closed by a pipe plug 9. To complete the valve body 3, the inlet port 4 and outlet port 5 may be provided at their ends with conventional coupling flanges 10 and 11, respectively, by which they may be appropriately connected to conduit means.

The upper cylindrical end 6a of valve chamber 6 is closed by a bonnet 12. The bonnet 12 has a flange portion 12a which rests upon the valve body 3 and is affixed thereto by a series of hex head screws 13 (see FIG. 1). A gasket 14 is located between the valve body 3 and the bonnet flange 12a.

The bonnet has a cylindrical body which is just nicely received in the cylindrical upper portion 6a of valve chamber 6. The bonnet is provided with an O-ring 15 making a sealing engagement with the cylindrical portion 6a of chamber 6. The bonnet 12 has a central bore 16 extending downwardly from the upper surface of the bonnet and terminating in a second coaxial bore 17 of lesser diameter.

The valve plug is shown at 18. The valve plug is conical in configuration and has a transverse passage 19 extending therethrough. The plug also carries a pair of diametrically opposed seals 18a and 18b (see FIG. 11), the purpose of which will be apparent hereinafter. At its lower end the plug 18 is provided with integral, cylindrical extension 20 of such diameter as to be just nicely received and rotatable within the cylindrical bore 7 of valve body 3. At its upper end, the plug 18 is provided with an upwardly extending, integral, cylindrical plug stem 21. The plug stem is rotatively received in the bonnet bore 17 and extends upwardly through bonnet bore 16. At its upper end, the plug stem 21 is provided with a transverse perforation 22. The purpose of perforation 22 will be described hereinafter.

To form a fluid-tight seal between the bonnet 12 and the plug stem 21, the lower portion of bonnet bore 16 is provided with packing 23. A conventional packing gland 24 is mounted in the upper end of bonnet bore 16 and has a first O-ring 25 in sealing engagement with plug stem 21 and a second O-ring 26 in sealing engagement with the inside surface of bonnet bore 16.

The valve actuator 2 comprises a cylindrical yoke 27 having an axial bore 28 extending therethrough. The lower end of yoke 27 is affixed to bonnet 12 by a series of hex head screws, some of which are shown in FIGS. 1 and 2 at 29. The upper end of yoke 27 is provided with a bearing spool 30. The bearing spool 30 has an annular flange 31 and the upper end of yoke 27 has a corresponding flange 32. The flanges 31 and 32 are joined together by a plurality of hex head cap screws, some of which are shown at 33. The bearing spool 30 houses a pair of thrust bearings 34 and 35. A valve stem is shown at 36. The valve stem 36 has an upper unthreaded portion 36a and a lower threaded portion 36b. The unthreaded valve stem portion 36a is located within bearing spool 30 and extends thereabove. The valve stem portion 36a carries an annular flange portion 36c, located between thrust bearings 34 and 35. The lower threaded valve stem portion 36b extends axially into yoke 27.

That portion of valve stem 36a which extends above bearing spool 30 carries a bevel gear 37 which engages a ball bearing 38 mounted in the top of bearing spool 30. The very uppermost end of valve stem portion 36a is threaded and carries a bearing nut 39 to retain bevel gear 37 thereon. The bevel gear 37 is non-rotatively mounted on the portion 36a of the valve stem by a key (not shown) or other suitable means.

The upper end of bearing spool 30 is provided with an annular flange 40. The annular flange 40 supports a gear housing 41, affixed thereto by hex head bolts, some of which are shown at 42. The gear housing 41 supports bearings 43 and 44 in which a pinion shaft 45 is mounted. Keyed, or otherwise non-rotatively affixed to pinion shaft 45 there is a pinion 46, adapted to cooperate with bevel gear 37. The pinion 46 is maintained on the end of pinion shaft 45 by a bearing nut 47 threadedly engaged on the end of the bearing shaft. The bearing shaft passes through a bearing retainer 48 which closes the open end of gear housing 41. The bearing retainer is affixed to the gear housing by a plurality of hex head bolts, some of which are shown at 49. The retainer carries a first O-ring 50 making a sealing engagement with pinion shaft 45 and a second O-ring at 51 making a sealing engagement with gear housing 41.

The free end of pinion shaft 45 carries a spacer 52, followed by a hand wheel 53. The hand wheel 53 is mounted on pinion shaft 45 in a non-rotative manner, such as by key means (not shown) or the like. Hand wheel 53 is held in place by means of washer 54 and hex head bolt 55, threadedly engaged in the end of pinion shaft 45.

It will be evident from the above description that rotation of handwheel 53 will result in rotation of valve stem 36, through the agency of gear 37 and pinion 46 oriented perpendicular to the valve stem. It would be within the scope of the present invention to mount the handwheel 53 directly on the end of the valve stem 36 in a horizontal orientation. Under these circumstances, bevel gear 37 and pinion 46 could be eliminated. While a handwheel 53 is illustrated as being mounted on pinion shaft 45, it will be understood by one skilled in the art that any other appropriate, conventional, manually manipulated device (such as a lever or the like) could be employed. Furthermore, pinion shaft 45 could be operatively connected to an appropriate form of prime mover.

Figure 7:
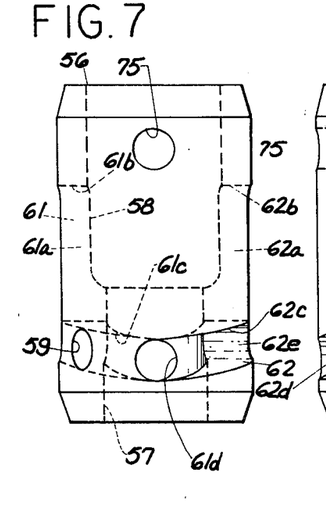
FIG. 7 is an elevational view of the coupling of the present invention.
Figures 8, 9, 10:
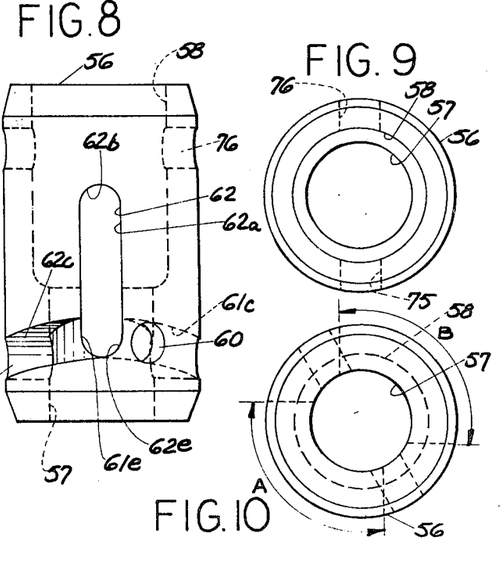
FIG. 8 is an elevational view of the coupling, as viewed from the right in FIG. 7.
FIG. 9 is a top view of the coupling of FIG. 7.
FIG. 10 is a bottom view of the coupling of FIG. 7.

The upper end of plug stem 21 is non-rotatively attached to a coupling 56. The coupling 56 is best shown in FIGS. 2, 7 and 8. The coupling is similar to the coupling described in the above-noted copending application.

Cylindrical coupling 56 has an external diameter such that it is freely shiftable and rotatable within the yoke bore 28. The cylindrical coupling 56 is provided with an axial bore having a first portion 57 of such diameter as to just nicely receive the upper end of plug stem 21. A second portion 58 of the axial bore is of slightly greater diameter for reasons which will be evident hereinafter.

Near its lower end, the coupling 56 is provided with a pair of diametrically opposed transverse perforations 59 and 60. These perforations 59 and 60 are adapted to be located so as to be coaxial with the transverse perforation 22 in the upper end of plug stem 21 and to receive a coupling pin 60a (see FIG. 2). In this manner, the plug stem 21 is non-rotatively affixed to coupling 58.

Coupling 58 also is provided with identical, diametrically opposed cam slots 61 and 62. Turning specifically to FIG. 8, cam slot 62 is clearly shown. Cam slot 62 has a first upper portion 62a which is vertical and terminates in a rounded end 62b. This cam slot also has a lower portion 62c which extends 90° about the coupling 56 and terminates in a rounded end 62d. The juncture of cam slot portions 62a and 62c is rounded as at 62e. It will be noted that cam slot 62 is substantially L-shaped, the portion 62c sloping downwardly from the juncture 62e to its rounded end 62d. The angle of slope of coupling cam slot portion 62c is chosen so as to permit 90° rotation of the coupling with a minimum of vertical movement commensurate with loads on the coupling and on the cam followers, as will be discussed hereinafter.

As indicated above, cam slot 61 is identical to cam slot 62. To this end, cam slot 61 has a vertical portion 61a terminating in an upper rounded end 61b. A lower cam slot portion 61c terminates in a rounded end 61d. The juncture of cam slot portion 61a and 61c is rounded as at 61e. The extent of cam slot portion 61c and the extent of cam slot portion 62c are indicated in FIG. 10 by arrows A and B, respectively.

Returning to FIG. 2, it will be noted that yoke 27 is provided with a pair of radially extending bosses 63 and 64. Bosses 63 and 64 have internally threaded perforations 65 and 66 therein, respectively. The bosses 63 and 64 support cam pins 67 and 68, respectively. The cam pins 67 and 68 are in the form of hex head screws, the forwardmost ends of cam pins 67 and 68 are of slightly less diameter and unthreaded, as shown in FIG. 2. These forwardmost ends of cam pins 67 and 68 are intended to extend into the coupling cam slots 61 and 62, respectively.

The upper end of coupling 56 and the lower portion 36b of valve stem 36 are connected by a cylindrical drive cam 69. Reference is made to FIGS. 3 through 6 wherein drive cam 69 is clearly shown. The drive cam 69 is cylindrical and has an upper portion 69a and a lower portion 69b of slightly lesser outside diameter. The drive cam is provided with an axial bore 70. The upper portion 70a of the axial bore is internally threaded and of such diameter as to threadedly receive the lower portion 36b of valve stem 36. The axial bore 70 has a central portion 70b of slightly greater diameter. Finally, there is a lower axial bore portion 70c of slightly lesser diameter than bore portion 70a. Bore portions 70b and 70c are unthreaded. The upper part of drive cam 69 is provided with a diametrically opposed pair of vertical slots 71 and 72. The purpose of these slots will be apparent hereinafter.

Figures 3, 4, 5, 6:
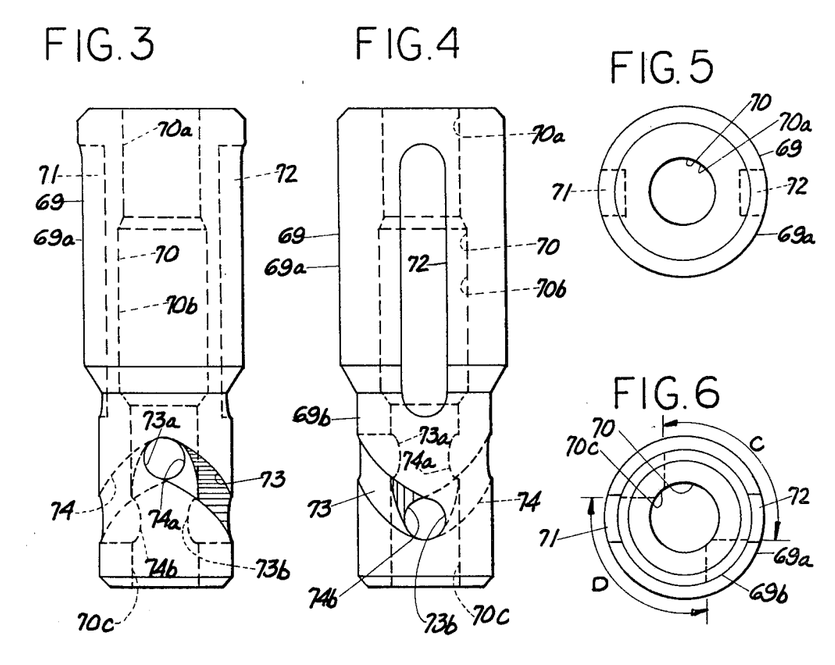
FIG. 3 is an elevational view of the drive cam of the present invention.
FIG. 4 is an elevational view of the drive cam, as viewed from the right in FIG. 3.
FIG. 5 is a top view of the drive cam of FIG. 3.
FIG. 6 is a bottom view of the drive cam of FIG. 3.

The lower portion 69b of drive cam 69 is provided with a pair of diametrically opposed, indentical drive slots 73 and 74. Drive slot 73 slopes downwardly and terminates in an upper rounded end 73a and a lower rounded end 73b. Similarly, drive slot 74 slopes downwardly and is provided with an upper rounded end 74a and a lower rounded end 74b. The drive slots 73 and 74 extend 90° about the lower portion 69b of drive cam 69. The extent of drive slot 73 and the extent of drive slot 74 are indicated in FIG. 6 by arrows C and D, respectively.

Reference is again made to FIG. 2. In FIG. 2 it will be noted that the lower end 36b of valve stem 36 is threadedly engaged in the threaded axial bore portion 70a of drive cam 69. The lower portion 69b of drive cam 69 is received within the bore portion 58 of coupling 56. The coupling 56, near its upper end, is provided with a pair of diametrically opposed perforations 75 and 76 (see FIGS. 7 through 9). A drive pin 77 joins the upper end of coupling 56 to the lower portion 69b of drive cam 69 by passing through coupling perforations 75 and 76 and drive cam drive slots 73 and 74.

To complete the structure, the yoke 27 is provided with a second pair of radially extending bosses 78 and 79 having internally threaded bores 80 and 81, respectively. The threaded bores 80 and 81 are adapted to receive guide pins 82 and 83, respectively. As in the case of cam pins 67 and 68, guide pins 82 and 83 are in the form of hex head bolts having forwardmost ends of slightly lesser diameter and free of threads. The forwardmost ends of guide pins 82 and 83 are adpated to be received in guide slots 71 and 72 of drive cam 69.

Figure 11:
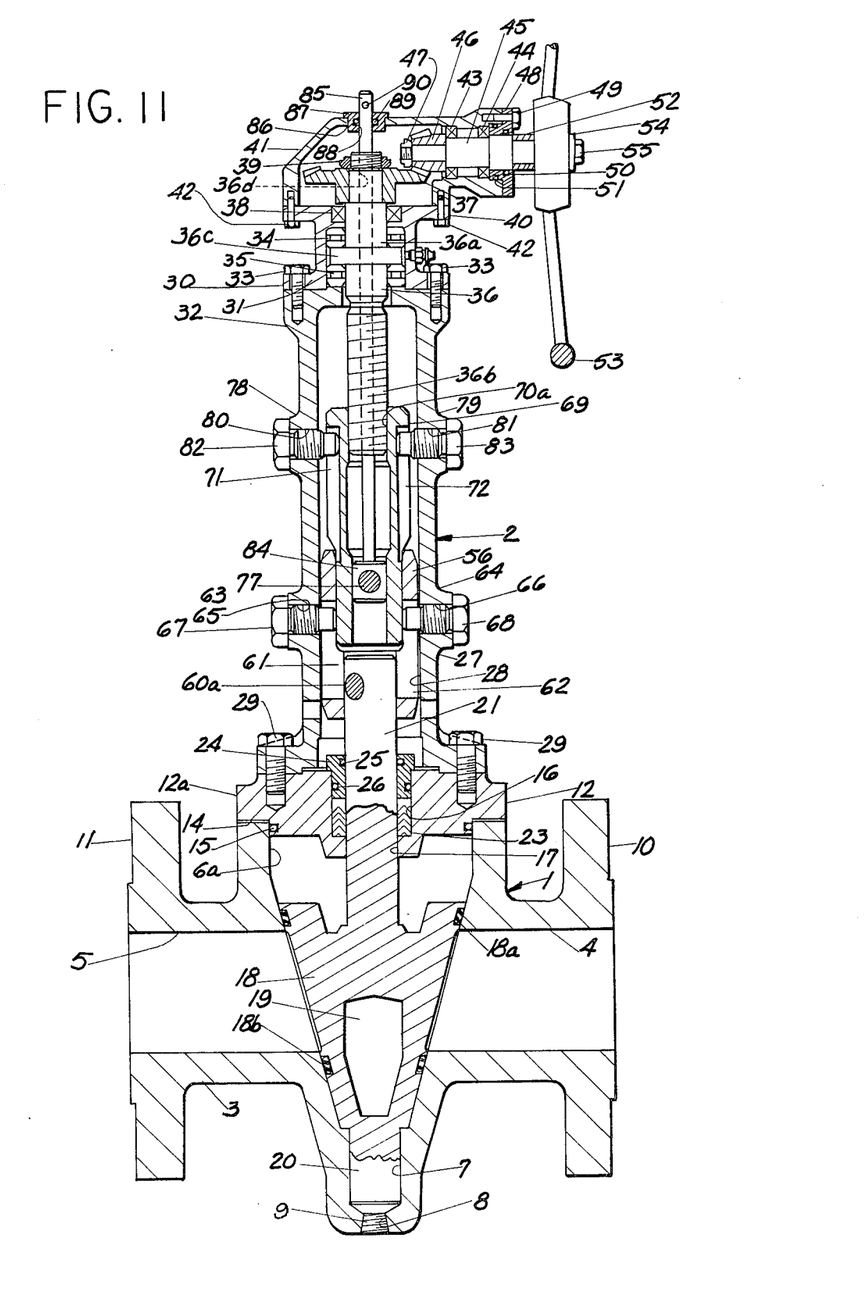
FIG. 11 is a cross-sectional view, similar to FIG. 2 and illustrating the plug in its closed and sealed position.

The structure having been fully described, its operation can now be readily understood with reference to FIGS. 2 and 11. FIG. 2 illustrates the plug 18 of valve 1 in its valve-open position. In this position, the plug 18 is raised away from the inside surface of chamber 6 and the transverse perforation 19 in the plug is aligned with inlet passage 4 and outlet passage 5.

In the open position of the plug, it will be understood that coupling 56 is also in its uppermost position. Thus, the end of cam pins 67 and 68 are located at the ends 61d and 62d of coupling cam slot portions 61c and 62c. Similarly, drive cam 69 is in its uppermost position within yoke 27 and drive pin 77 is located at the bottom ends 73b and 74b of drive cam drive slots 73 and 74.

To cause plug 18 to shift to its valve-closed position, handwheel 53 is turned in that direction which will result in rotation of valve stem 36 such that drive cam 69 will move downwardly. The drive cam 69 is caused to move downwardly by rotation of valve stem 36 since the drive cam is precluded from rotation within the yoke 26 by the engagement of guide pins 82 and 83 in drive cam guide slots 71 and 72, respectively.

The downward movement of drive cam 69 is transmitted to coupling 56 via drive pin 77. As coupling 56 moves downwardly with drive cam 69, cam pins 67 and 68 will shift along the lower, circumferential, inclined portions 61c and 62c of cam slots 61 and 62. This will result in rotation of coupling 56, plug stem 22 and plug 18 90° during the initial downward movement of these elements. This rotation will stop when cam pins 67 and 68 reach the juncture points 61e and 62e of cam slots 61 and 62. As a result of this rotation, the axis of the transverse perforation 19 of valve plug 18 now lies at an angle of 90° to the axes of inlet port 4 and outlet port 5. As further downward movement of the drive cam 69 and coupling 56 continues, cam pins 67 and 68 will be engaged in the upper vertical portions 61a and 62a of coupling cam slots 61 and 62. This precludes further rotation of plug 18 and its stem 22 so that only a vertical downward motion is imparted to these elements. This motion continues until plug 18 is fully seated in the valve chamber 6 with its resilient seals 81a and 81b in sealing engagement with the wall of the valve chamber about the openings formed therein by inlet port 4 and outlet port 5. This position of the valve plug is illustrated in FIG. 11.

It will be noted from FIG. 11 that the coupling 56 is in its lowermost position with cam pins 67 and 68 adjacent to the upper ends 61b and 62b of cam slots 61 and 62. Similarly, drive cam 69 is in its lowermost position with drive pin 77 located at the upper ends 73a and 74a of drive slots 73 and 74.

It will be understood that during the shifting of plug 18 from its open position (FIG. 2) to its closed position (FIG. 11), the motion of plug 18 is controlled by coupling 56 and its cam slots 61 and 62. It should at the same time be noted that drive pin 77 has shifted from the lowermost ends 73b and 74b of slots 73 and 74 to the uppermost ends 73a and 74a of slots 73 and 74. This shifting of drive pin 77 in the slots 73 and 74 takes place during that portion of the closing procedure wherein plug 18 not only moves downwardly but also rotates 90°. Throughout this quarter turn of plug 18, the thrust of drive cam 69 is directed to coupling 56 through drive pin 77 and the desired part of this force is converted to torque because drive cam slots 73 and 74 are suitably angled so as to produce the desired torque. In this way, the drive cam 69 serves its function to add additional torque to coupling 56 throughout the quarter turn of plug 18. This additional torque is particularly desirable in dealing with large valves or with valves handling high pressure fluids. It will be understood by one skilled in the art that the steeper the angle of drive cam slots 73 and 74, the more thrust of the drive cam is converted to torque. At the same time, the vertical travel of these elements must also be increased since each of the slots must extend around one quarter of the drive cam's circumference. However, the increased length required only affects the yoke housing drive cam and stem, which are not significant from a design or cost standpoint and does not affect the compact design of the body-plug assembly. The slope angle of the drive cam should be chosen solely upon the desired torque output. Once the quarter turn of plug 18 is complete, the drive cam 69 is locked together with coupling 56 and all thrust generated by stem 36, is guided downwardly by cam pins 67 and 68 to wedge plug 18 in its closed and sealed position.

In other words, the additional travel required by the steeper angle of drive slots 73 and 74 of drive cam 69 is accommodated in the length of yoke 27 and is independent of the original body 1-plug 18 configuration of the valve design as dictated by the coupling 56. This allows for the most economical body-plug design.

The closing process just described is reversed when plug 18 is shifted from its closed and sealed position (FIG. 11) to its open position (FIG. 2). Thus, when handwheel 53 is turned so as to impart rotation to valve stem 36 such that drive cam 69 moves upwardly within yoke 27, this upward movement of the drive cam is transmitted via drive pin 77 to coupling 56 and thus to plug 18 and its stem 21. Initially, cam pins 67 and 68 will be at the upper ends 61b and 62b of cam slots 61 and 62. Similarly, drive pin 77 will be at the upper ends 73a and 74a of drive slots 73 and 74. As the assembly moves upwardly, the plug will be lifted without rotation since cam pins 67 and 68 are traveling in the vertical portions 61a and 62a of cam slots 61 and 62. Drive pin 77 remains at the uppermost ends 73a and 74a of drive slots 73 and 74. Once cam pins 67 and 68 reach the juncture point 61e and 62e of cam slots 61 and 62, they will thereafter ride in the lower, angled cam slot portions 61c and 62c. As a result of this, plug 18 will not only shift upwardly, but also will simultaneously rotate 90° until the ends 61d and 62d of cam slot portions 61c and 62c are reached by cam pins 67 and 68. It is during this rotation of the plug that drive pin 77 will shift downwardly through drive slots 73 and 74 to their lower ends 73b and 74b. Thus, part of the force applied by drive cam 69 and directed through drive pin 77 is converted to torque during the quarter turn of plug 18. As in the case of the closing procedure, during the opening procedure the actual movement of plug 18 is governed by coupling 56 and its cam slots 61 and 62.

Returning to FIG. 2, the drive pin 77 has a fitting 84 mounted thereon. The fitting 84 may ride loosely on pin 77, or may be affixed thereto by a set screw or the like. Welded, or otherwise appropriately affixed at fitting 84, there is an indicator rod 85. The indicator rod passes upwardly through an axial bore 36d in valve stem 36.

To accommodate for indicator rod 85, the gear housing 41 is provided with an opening 86, closed by a dust cover 87. The dust cover has a bore 88 through which indicator rod 85 passes. The dust cover may also have an O-ring 89 making a seal with indicator rod 85. Finally, indicator rod 85 carries a transverse rod 90 appropriately affixed thereto. For purposes of an exemplary showing, the transverse rod 90 is shown passing through a perforation in indicator rod 85. It will be understood by one skilled in the art that as the plug 18 shifts and rotates between its open position and its closed and sealed position, the indicator rod 85 will shift vertically and rotate with it. This gives a visual indication to the operator of the position of plug 18 at any given time.

The actuator of the present invention is self-locking against any turning force acting upon the plug due to the simultaneous requirement for vertical movement during any turning of the plug. This, together with the threads of valve stem 36, lock the mechanism.

Modifications may be made in the invention without departing from the spirit of it. For example, in the above-mentioned copending application Ser. No. 29,678, now U.S. Pat. No. 4,293,117, a second embodiment of plug valve is taught which differs from the first only in that cam slots are formed in the yoke of the structure, rather than in the coupling, and the coupling bears a transversely extending pin which rides in the yoke cam slots. The cam slots are again of L-shaped configuration, but in this instance are inverted with respect to their orientation when located in the coupling. It will be understood by one skilled in the art that the teachings of the present invention may be applied to such an embodiment of valve actuator and would be the full equivalent of the teachings of the present invention.

Similarly, in the embodiment illustrated herein, it would be within the scope of the invention to eliminate the vertical drive cam guide slots 71 and 72 and to provide similar slots in the body of yoke 27. Under these circumstances, guide pins 82 and 83 would be eliminated and similar radially oriented guide pins would be mounted on drive cam 69 with their free ends in engagement with the vertical slots of the yoke. Thus, in essence, the positions of vertical drive cam slots 71 and 72 and guide pin 82 and 83 could be interchanged.

What is claimed is:

1. A high torque actuator for a plug valve of the type having a body with a plug chamber and diametrically opposed inlet and outlet ports communicating with said chamber, a plug in said chamber, having a transverse passage therethrough and an upstanding stem, said plug being shiftable between a first, upper, valve-open position with its transverse passage in alignment with said inlet and outlet ports and a second, lower, valve-closed portion wherein the axis of said transverse plug passage is oriented at 90° to the axes of said inlet and outlet ports, seal means on said plug, said seal means being in engagement with the interior surface of said chamber about said inlet and outlet ports when said plug is in said second, valve closed position, means closing the upper end of said chamber through which said plug stem extends in fluid-tight fashion, said actuator comprising a yoke having a vertical axial bore therethrough, said yoke having a lower end operatively attached to said plug valve with said plug stem extending into said yoke axial bore, said yoke having an upper end, a bearing spool mounted on said yoke upper end, an elongated valve stem being rotatively mounted in said bearing spool and having a lower threaded portion extending into said yoke and being coaxial with said plug stem, a cylindrical coupling located within said axial bore of said yoke and being both rotatable and vertically shiftable therein, said coupling having upper and lower portions and an axial bore therethrough, the upper end of said plug stem being non-rotatively affixed to said lower portion of said coupling, one of said yoke and coupling having a pair of diametrically opposed identical cam slots formed therein, a cam follower for each of said cam slots being supported by the other of said yoke and coupling, an elongated drive cam located within said yoke and extending axially thereof, said drive cam having an axial bore the upper part of which is threaded and threadedly engaged by said lower threaded portion of said valve stem, means to prevent rotation of said drive cam within said yoke axial bore, said drive cam having a lower portion containing a pair of diametrically opposed, identical, sloping drive slots each extending 90° thereabout, said lower portion of said drive cam being received within the axial bore of said upper portion of said coupling, said upper portion of said coupling having a pair of diametrically opposed perforations, a drive pin connecting said lower portion of said drive cam to said upper portion of said coupling, said drive pin extending through said drive cam drive slots with its ends located in said coupling perforations, said coupling cam slots being so configured that upon turning said valve stem in one direction to cause said drive cam and said coupling to shift downwardly in said yoke, said plug in said valve-open position will be simultaneously partially lowered and turned 90° and thereafter lowered without rotation to said valve-closed position with said plug seals in engagement with said chamber interior surface about said inlet and outlet ports and upon turning said valve stem in the opposite direction, to shift said drive cam and said coupling upwardly in said yoke, said plug will first be lifted vertically without rotation out of sealing relationship with said chamber inlet and outlet ports and thereafter will be simultaneously lifted and rotated 90° to said valve-open position, said drive slots of said drive cam being so configured as to cooperate with said drive pin to increase the torque imparted to said plug during said 90° turn of said plug when shifted between its valve-open and valve-closed positions.

2. The structure claimed in claim 1 wherein said means to prevent rotation of said drive cam within said yoke comprises identical diametrically opposed vertical guide slots in one said drive cam and said yoke and a guide pin for each of said guide slots supported by the other of said drive cam and said yoke and having a free end extending into its respective guide slot.

3. The structure claimed in claim 1 wherein said cam slots are formed in said cylindrical coupling, each of said cam slots being substantially L-shaped and having a first vertical portion and a second portion sloping downwardly from said first portion and extending 90° about said coupling, said cam followers being mounted on said yoke and extending into said cam slots.

4. The structure claimed in claim 2 wherein guide slots are formed in said drive cam and said guide pins are mounted in said yoke.

5. The structure claimed in claim 4 wherein said cam slots are formed in said cylindrical coupling, each of said cam slots being substantially L-shaped and having a first vertical portion and a second portion sloping downwardly from said first portion and extending 90° about said coupling, said cam followers being mounted on said yoke and extending into said cam slots.

6. The structure claimed in claim 5 including a manually manipulated means operatively connected to said valve stem.

7. The structure claimed in claim 6 wherein said cam followers and said guide pin comprise bolts mounted in diametrically opposed, threaded, transverse bores in said yoke, each of said bolts having an unthreaded orwardmost end located within its respective one of said cam slots and guide slots.

8. The structure claimed in claim 7 wherein said upper end of said plug stem extends upwardly into said axial coupling bore and s affixed to said coupling by a pin extending through coaxial transverse perforations in said coupling and said upper end of said plug stem.

9. A high torque actuator for a plug valve of the type having a body with a central chamber having diametrically opposed inlet and outlet ports and a plug within said chamber having a transverse passage therethrough and an upstanding stem, said plug having a first, upper valve-open position with its transverse passage in alignment with said inlet and outlet ports, and a second, lower, valve-closed and sealed position wherein its transverse passage is oriented at 90° to said chamber inlet and outlet ports, means closing the top of said chamber through which said plug stem extends in fluid-tight fashion, said actuator comprising a hollow cylindrical yoke having a lower end operatively affixed to said plug valve with said plug stem extending axially into said yoke, a valve stem rotatively mounted at the upper end of said yoke and having a lower threaded portion extending axially into said yoke, an elongated drive cam extending axially in said yoke, said threaded portion of said valve stem being threadedly engaged with said drive cam to shift said drive cam axially within said yoke, means to prevent rotation of said drive cam about its axis, said drive cam having a lower end with diametrically opposed identical sloped drive slots therein, a cylindrical coupling having an axial bore, said lower portion of said drive cam being received within said coupling axial bore and affixed therein by a drive pin passing through said drive slots and having ends mounted in diametrically opposed perforations in said coupling, the upper end of said plug stem being non-rotatively affixed to said coupling, said coupling having diametrically opposed cam slots formed therein, said yoke mounting a cam follower for each of said cam slots, said cam slots being so configured that upon turning said valve stem to shift said drive cam downwardly, said plug in its valve-open position will be simultaneously partially lowered and rotated 90° and thereafter lowered without rotation by said coupling to said valve-closed and sealed position and upon turning said stem in the opposite direction to shift said drive cam upwardly said plug will first be lifted vertically without rotation and thereafter simultaneously lifted and rotated 90° to its valve-open position, said drive cam drive slots being so configured as to cooperate with said drive pin to impart additional torque to said coupling during rotation of said plug.

* * * * *